(No Model.)
M. A. LEE.
NUT AND BOLT LOCK.
No. 463,521.    Patented Nov. 17, 1891.
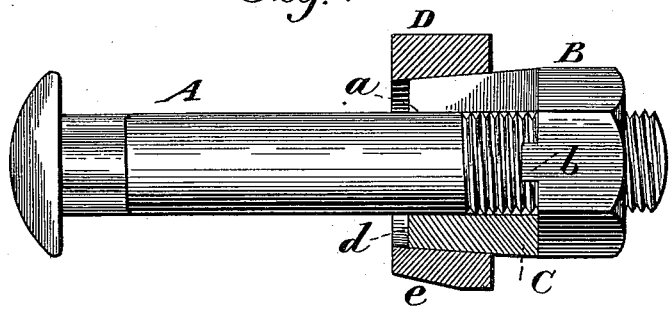
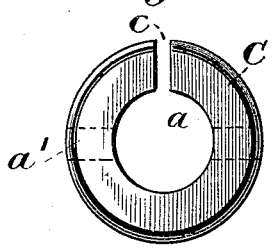
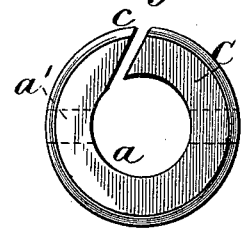
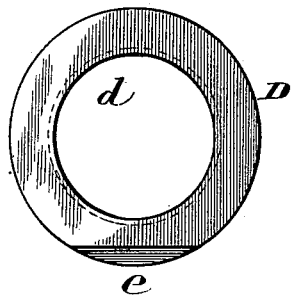
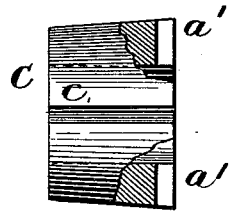
Witnesses:
A. Ruppert.
E. Cruse.
Inventor:
Mark A. Lee,
by G. H. W. T. Thomas
Attys.

UNITED STATES PATENT OFFICE.

MART A. LEE, OF WINDSOR, ASSIGNOR OF ONE-HALF TO JOSEPH R. BRAVO, OF BINGHAMTON, NEW YORK.

NUT AND BOLT LOCK.

SPECIFICATION forming part of Letters Patent No. 463,521, dated November 17, 1891.

Application filed April 18, 1891. Serial No. 389,532. (No model.)

*To all whom it may concern:*

Be it known that I, MART A. LEE, of Windsor, in the county of Broome and State of New York, have invented certain new and useful Improvements in Nut and Bolt Locks, of which the following is a specification.

This invention consists in a device to prevent a nut from turning and releasing objects bolted together, and is especially applicable to bolts in use on track-work for locomotive and car construction, and for use in other places or conditions where frequent jar creates a liability to loosen the nut.

In the accompanying drawings, Figure 1 is a view of my invention, partly in longitudinal section. Figs. 2, 3, 4, and 5 represent details hereinafter described.

Similar letters of reference indicate similar parts in the respective figures.

A is a bolt, having a threaded portion at one end, upon which is screwed a nut B.

C is a sleeve bored at $a$ to loosely fit over the bolt, the sleeve being given exteriorly a tapered form, as shown in Figs. 1 and 5, and having recesses $a'$, into which fit projections $b$, extending from the under face of the nut B. The construction is such that as the nut is turned the sleeve C will turn with it. It is obvious that the projections may be upon the sleeve instead of on the nut and the recesses in the latter. The sleeve C is cut, as at $c$, in one of the ways shown in Fig. 2 or Fig. 3, the cut preferably extending the entire length of the sleeve, whereby the latter is given a certain degree of elasticity.

D is a collar having a tapered hole $d$ to receive the sleeve C.

The several parts are shown in position in Fig. 1. A face view of the collar D is shown in Fig. 4, and detached views of the sleeve C are given in Figs. 2, 3, and 5.

The operation is as follows: When two or more objects are to be secured together by means of this device, the face of the collar D toward the head of the bolt A is pressed against the object with which it is to engage by applying a wrench to the nut B. The engagement of the nut B and sleeve C through the medium of the projections $b$ and recesses $a'$ causes the nut and sleeve to be turned together, and the sleeve is pushed into the tapering hole $d$ of the collar D, causing excessive friction, the collar at the same time being firmly forced against the object to be secured. Should the nut have a tendency to unscrew or loosen, the sharp edge of the cut $c$ in the sleeve would cut into the collar, while at the same time the friction of the sleeve in the collar would be so excessive that it would be impossible for it to become released. The cut $c$ in the sleeve C may be radial, as shown in Fig. 2, or diagonal, as seen in Fig. 3. I do not restrict myself to the precise nature of the cut or to the number of the recesses in the sleeve or nut adapted to engage with the projections of the nut or sleeve. A side of the collar D is preferably flattened, as represented by $e$, so that when in engagement with an object the collar itself may be prevented from turning.

Having described my invention, I claim—

The combination, with a threaded bolt, of a collar fitting loosely over said bolt and being tapered interiorly, an exteriorly tapered sleeve adapted to pass freely over the bolt and enter the tapered hole in the collar, said sleeve being cut through its wall longitudinally from end to end for the purpose specified, a nut adapted to engage the sleeve and force it into the tapered hole in the collar, and means, substantially as described, to lock the sleeve and nut together, as set forth.

In testimony whereof I hereto set my hand and affix my seal.

MART A. LEE. [L. S.]

Witnesses:
 GEORGE F. LYON,
 C. H. HITCHCOCK.